(12) United States Patent
Kimura et al.

(10) Patent No.: US 9,967,438 B2
(45) Date of Patent: May 8, 2018

(54) IMAGE PROCESSING APPARATUS

(71) Applicant: DENSO CORPORATION, Kariya, Aichi-pref. (JP)

(72) Inventors: Takayuki Kimura, Kariya (JP); Toshikazu Murao, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days. days.

(21) Appl. No.: 14/778,823

(22) PCT Filed: Feb. 18, 2014

(86) PCT No.: PCT/JP2014/053776
§ 371 (c)(1),
(2) Date: Sep. 21, 2015

(87) PCT Pub. No.: WO2014/148175
PCT Pub. Date: Sep. 25, 2014

(65) Prior Publication Data
US 2016/0050342 A1     Feb. 18, 2016

(30) Foreign Application Priority Data
Mar. 22, 2013   (JP) .................................. 2013-060195

(51) Int. Cl.
*H04N 5/04*     (2006.01)
*H04N 5/232*    (2006.01)
(Continued)

(52) U.S. Cl.
CPC ................. *H04N 5/04* (2013.01); *B60R 1/00* (2013.01); *H04N 5/23229* (2013.01);
(Continued)

(58) Field of Classification Search
CPC ...... H04N 5/04; H04N 5/225; H04N 5/23229; H04N 5/23245; H04N 5/343;
(Continued)

(56) References Cited

U.S. PATENT DOCUMENTS

2006/0204037 A1* 9/2006 Watanabe .......... G06K 9/00805
382/104
2010/0259615 A1 10/2010 Yamamoto
(Continued)

FOREIGN PATENT DOCUMENTS

JP     2003-333409 A    11/2003
JP     2006-350670 A    12/2006
(Continued)

OTHER PUBLICATIONS

International Preliminary Report on Patentability; International Application No. PCT/JP2014/053776; Filed: Feb. 18, 2014 (with English translation).

(Continued)

*Primary Examiner* — Trang U Tran
(74) *Attorney, Agent, or Firm* — Knobbe, Martens, Olson & Bear, LLP

(57) ABSTRACT

An imaging means acquires an imaged image in a predetermined imaging range for each predetermined frame rate. An image processing means performs image processing on image data of the image captured by the imaging means. A first setting means (S420) sets the imaging means to image a predetermined first range in the imaging range with a predetermined first frame rate. A second setting means (S430) sets the imaging means to image a second range, which is a part of the imaging range imaged by the imaging means and is narrower than the first range, with a second frame rate higher than the first frame rate. A determination means (S420) selects one of the first setting means and the (Continued)

second setting means depending on process contents that the image processing performs.

1 Claim, 7 Drawing Sheets

(51) Int. Cl.
*H04N 5/343* (2011.01)
*H04N 5/345* (2011.01)
*B60R 1/00* (2006.01)
*G06K 9/00* (2006.01)

(52) U.S. Cl.
CPC .......... *H04N 5/23245* (2013.01); *H04N 5/343* (2013.01); *H04N 5/3454* (2013.01); *B60R 2300/307* (2013.01); *G06K 9/00791* (2013.01)

(58) Field of Classification Search
CPC ...... H04N 5/3454; H04N 5/14; H04N 5/2228; H04N 5/2251; H04N 5/23293; B60R 1/00; B60R 2300/307; G06K 9/00791
USPC ................................ 348/500, 148, 43, 208.1
See application file for complete search history.

(56) References Cited

U.S. PATENT DOCUMENTS

2012/0057034 A1    3/2012  Tanaka
2012/0127337 A1*   5/2012  Okada .................. H04N 5/3537
                                                  348/223.1

FOREIGN PATENT DOCUMENTS

JP      2010-251938 A     11/2010
JP      2012-060371 A      3/2012
WO      20141148175 A1     9/2014

OTHER PUBLICATIONS

International Search Report; International Application No. PCT/JP2014/053776, filed on Feb. 18, 2014; dated Apr. 15, 2014; 8 pages.

* cited by examiner

FULL SCREEN MODE IMAGING RANGE
(NUMBER OF PIXELS m × n)

SEGMENT SCREEN MODE IMAGING RANGE
(NUMBER OF PIXELS m × p (p<n))

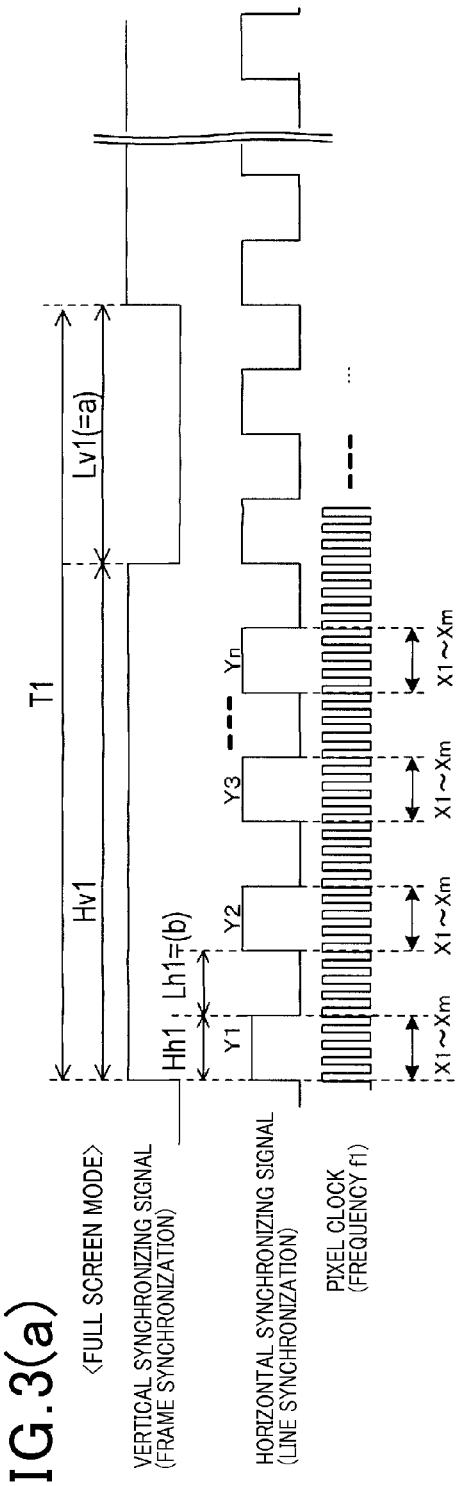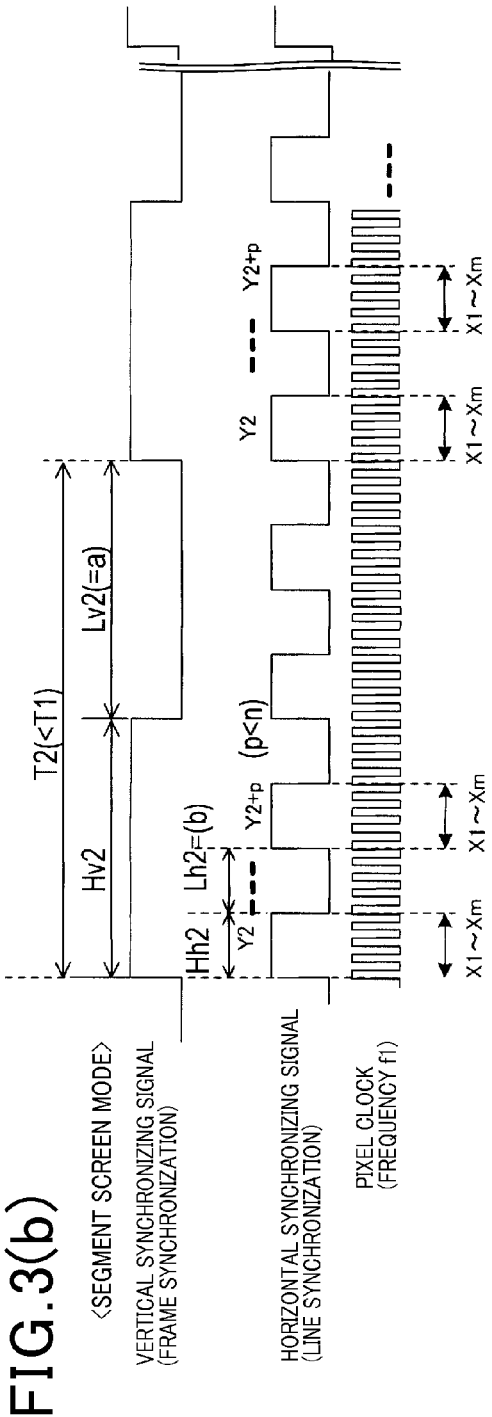

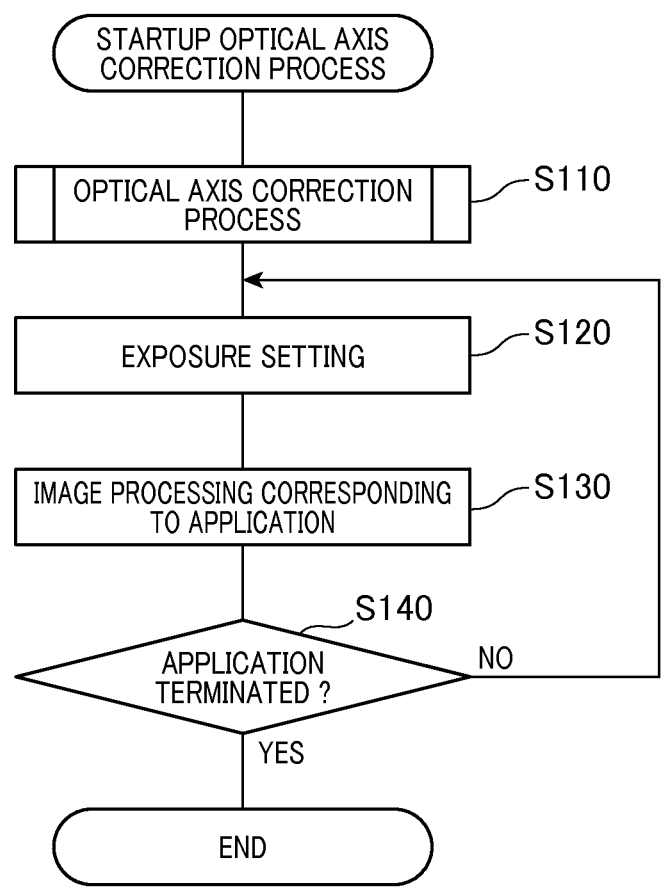

IMAGE PROCESSING APPARATUS

TECHNICAL FIELD

The present invention relates to an image processing apparatus that performs image processing using image data acquired by an imaging means.

BACKGROUND ART

Conventionally, an image processing apparatus that performs image processing for various purposes (applications) by using image data imaged by an imaging means is known. Such an image processing apparatus performs the image processing using the whole image data imaged by the imaging means (hereinafter, referred to as full screen data), or using a required portion segmented from the full screen data (segment image data) depending on the application. For example, an apparatus that adjusts an optical axis of an imaging means is known as an image processing apparatus that performs image processing using segmented image data (refer to Patent Document 1, for example).

PRIOR ART

Patent Document

[Patent Document 1] Japanese Patent Application Laid-Open Publication No. 2010-251938

DISCLOSURE OF THE INVENTION

Problems to be Solved by the Invention

Frequencies with which the application is performed vary depending on the purpose and the use. For example, when attempting to perform an application that requires the image processing more frequently, since it must acquire the full screen data at a higher frame rate in the conventional apparatus, a problem arises that a frequency of an operation clock for operating the imaging means needs to be increased.

The present invention has been made in light of the problems set forth above and has as its object to provide an image processing apparatus that can corresponds to various applications without using a high-speed operation clock.

Means for Solving the Problems

In order to achieve the above object, an image processing apparatus that processes an image captured by an imaging means in a predetermined imaging range for every predetermined frame rate according to claim 1, includes an image processing means that performs image processing on image data of the image captured by the imaging means, a first setting means that sets the imaging means to image a predetermined first range in the imaging range with a predetermined first frame rate, a second setting means that sets the imaging means to image a second range, which is a part of the imaging range imaged by the imaging means and is narrower than the first range, with a second frame rate higher than the first frame rate, and a determination means that selects one of the first setting means and the second setting means depending on process contents that the image processing means performs, and the first setting means is selected in a process content with an infrequent performance among the process contents.

Therefore, the image processing apparatus of the present invention may implement the image processing required for an application at a required performance frequency without using a high-speed operation clock. Here, when implementing an application that requires the image processing more frequently, the image processing apparatus orders the imaging means to acquire data for the second range being an image range that is at least required for the implementation of the application, and performs the image processing using the image data. According to this, since there is no process required for segmenting an image area, it is possible to reduce a process load of the image processing apparatus.

Here, as disclosed in claim 2, the first setting means may set the first range to an entire area of the imaging range. Further, as disclosed in claim 3, the second setting means may set one pair of the second range and the second frame rate, or may set a plurality of the second range and the second frame rate.

Furthermore, as disclosed in claim 4, the imaging means may operate according to clocks of the same frequency regardless of a determination in the determination means. That is, in the image processing apparatus of the present invention, since the change of the frame rate is performed without changing the frequency of the operation clock, deterioration or heat generation of the EMC properties concerned when the frequency of the operation clock is increased is suppressed from increasing.

Moreover, as disclosed in claim 5, there may be provided a deviation amount calculating means that calculates a deviation between a focus of expansion in the image captured by the imaging means and a center of the image, and the second setting means sets the second range based on the deviation.

BRIEF DESCRIPTION OF THE DRAWINGS

FIG. 3 (a) shows an explanatory diagram explaining timing signals of the full screen mode, and (b) shows an explanatory diagram explaining timing signals of the segment screen mode;

FIG. 5 shows a flowchart expressing contents of a startup optical axis correction process;

MODE FOR CARRYING OUT THE INVENTION

An embodiment of the present invention will be described with reference to the accompanying drawings.

First Embodiment

1. Overall Configuration

Figure 1:
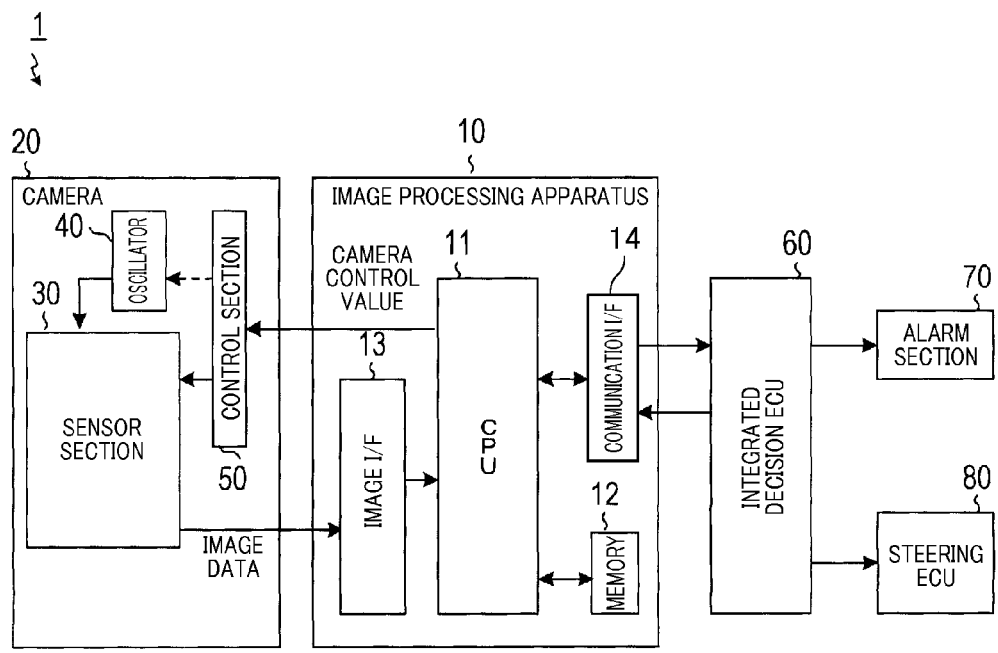
FIG. 1 shows a block diagram that expresses a configuration of an image processing apparatus of a first embodiment.

FIG. 1 is a block diagram showing a configuration of an image processing apparatus 10 of a first embodiment.

The image processing apparatus 10 is intended to be used in a state of being mounted on a vehicle, and implements an alarm process and a steering control based on recognition of a forward vehicle together with a vehicle-mounted camera 20 (hereinafter, simply referred to as a camera) that is mounted on the vehicle, an integrated decision ECU 60, an alarm section 70 and a steering ECU 80. Note that a configuration formed by the image processing apparatus 10 and the camera 20 will be called a camera system 1.

The camera 20 is disposed in a predetermined position in a vehicle cabin, such as in a back of a rear-view mirror, and images a road ahead in a traveling direction of the vehicle. When the camera 20 is disposed in the predetermined position in the vehicle cabin, its direction and the like are adjusted so that its imaging range becomes a predetermined imaging range in the traveling direction of the vehicle.

The camera 20 includes a sensor section 30 having a CMOS image sensor formed of a known PD array in which PD (Photo Diodes) are arranged in vertical and horizontal directions, an oscillator 40, and a control section 50, and it is configured that an exposure time (shutter speed), a gain of a signal (pixel value) outputted to the image processing apparatus 10, a frame rate, an imaging range, and the like are allowed to be adjusted according to an order from the control section 50 based on camera control values from the image processing apparatus 10. The camera 20 outputs a digital signal representing a luminance (brightness) of each pixel of an imaged image as a pixel value to the image processing apparatus 10 together with vertical and horizontal synchronizing signals of the image.

This camera 20 outputs the pixel value at a timing when the sensor section 30 follows the vertical and horizontal synchronizing signals and a pixel clock (hereinafter, these are referred to as timing signals), and the oscillator 40 generates these timing signals in accordance with an instruction from the control section 50.

The vertical synchronizing signal is a signal for setting a separation of one frame (a total number of pixels in the imaging range), the horizontal synchronizing signal is a signal for setting a separation in each horizontal direction within the frame, and the pixel clock is a signal (operating clock) for setting a timing for acquiring the pixel value of each pixel of the imaged image by the sensor section 30. The pixel clock is fixed to a predetermined frequency in the camera 20. Further, the time required to separate the one frame is variable, and a minimum time is configured to be a sufficiently large value as compared with an imaging time (exposure time).

The control section 50 controls adjustments of the frame rate and the imaging range based on the camera control values outputted from the image processing apparatus 10.

Specifically, as the camera control values to adjust the frame rate, a period that sets the vertical synchronizing signal to high (referred to as the vertical synchronizing signal high period Hv) and a period that sets the vertical synchronizing signal to low (referred to as the vertical synchronizing signal low period Lv), and a period that sets the horizontal synchronizing signal to high (referred to as the horizontal synchronizing signal high period Hh) and a period that sets the horizontal synchronizing signal to low (referred to as the horizontal synchronizing signal low period Lh) are set. It should be noted that lengths of the vertical synchronizing signal low period Lv and the horizontal synchronizing signal low period Lh are respectively set to a fixed time. In the following, when necessary, the length of each period Hv, Lv, Hh, Lh, is to be represented by these symbols.

In addition, as a parameter for adjusting the imaging range, a coordinate on an imaging screen of a first pixel imaged in the imaging range (referred to as a start coordinate S), and a coordinate on the imaging screen of a last pixel imaged (referred to as an end coordinate E) are set.

Figure 2A:
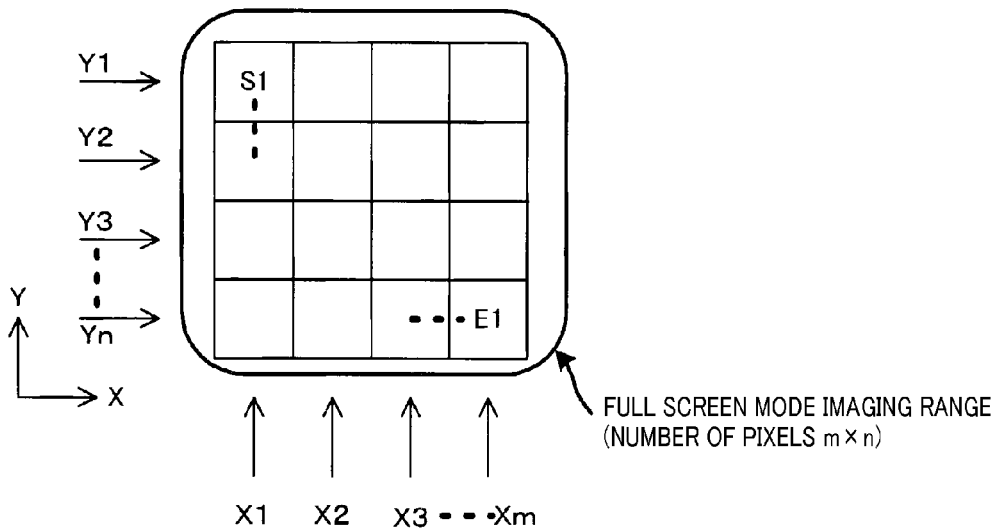
FIG. 2 (a) shows an explanatory diagram explaining an imaging range of a full screen mode, and (b) shows an explanatory diagram explaining an imaging range of a segment screen mode.
Figure 2B:
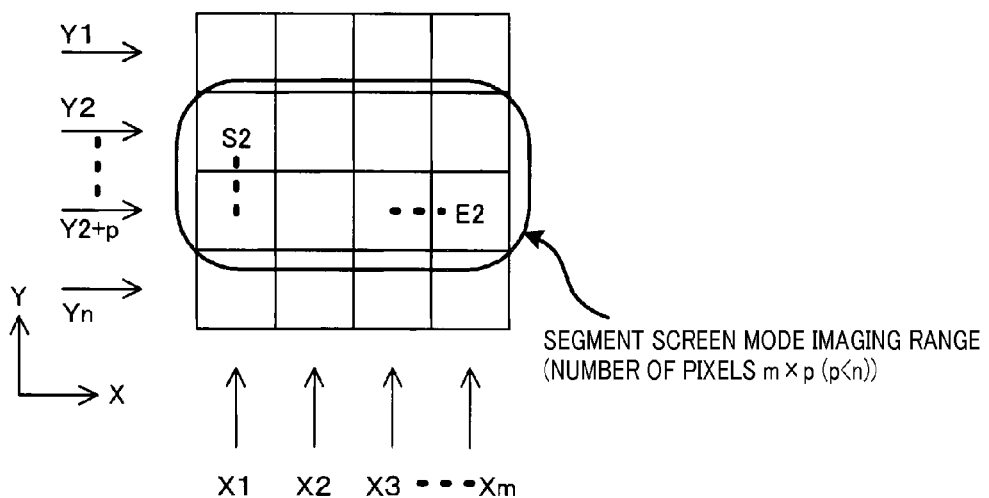

Here, as shown in FIG. 2 (a), each timing signal when acquiring the pixel values of an entire rectangular imaging screen (hereinafter, referred to as a full screen) composed of m pixels in an x direction and n pixels in a y direction will be explained. During the period that both vertical and horizontal synchronizing signals are set high, the control section 50 controls so as to output the pixel values from the sensor section 30 according to the pixel clock.

First, the start coordinate S1 of the imaging range is set to an upper left corner of a screen of the full screen, and the end coordinate E1 is set to a lower right corner of the screen.

Then, as shown in FIG. 3 (a), the length of the vertical synchronizing signal high period Hv1 is set as a time required for acquiring the pixel values of the full screen (number of all pixels (m×n pixels)). The length of the vertical synchronizing signal low period Lv1 is set to a predetermined time a. A total length of the period Hv1 and the period Lv1 is determined as a cycle of the vertical synchronizing signal, that is, a frame period T1.

Moreover, the length of the horizontal synchronizing signal high period Hh1 here is set as a product of a period of the pixel clock and a number of pixels in the x direction (m) as a time required for acquiring the pixel values of m pixels in the x-direction. The length of the horizontal synchronizing signal low period Lh1 is set to a predetermined time period b. A total length of the period Hh1 and the period Lh1 is determined as a period of the horizontal synchronizing signal. Hereinafter, such a mode of acquiring the pixel values of the full screen will be called a full screen mode.

Next, as shown in FIG. 2 (b), a timing signal when acquiring the pixel values of a segment screen that a part of the full screen is segmented (called a segmenting mode) will be explained. For simplicity, the segment screen is a rectangular screen composed of a number of pixels of m×p (m×p<m×n) with m pixels in the x direction and a number of pixels of p (p<n) in the y direction.

In this case, the start coordinate S2 and the end coordinate E2 are set in the upper left corner and lower right corner of the segment screen, respectively. Further, as shown in FIG. 3 (b), the length of the vertical synchronizing signal high period Hv2 is set to a time required for acquiring the pixel values of p lines. Since the numbers of the pixels in the x direction are the same, the length of the horizontal synchronizing signal high period Hh2 is set to the same value as the length of the horizontal synchronizing signal high period Hh1 in the full screen mode. Since the number of lines to be acquired is small (the number of pixels to be acquired is small), a frame period T2 of the segment screen mode is determined to be shorter than the frame period T1 of the full screen mode.

Thus, when the camera 20 is configured to acquire the pixel values of a wider imaging range (the number of pixels is large), the frame rate is set low as a result. On the other hand, when it is configured to acquire the pixel values of a narrower imaging range (the number of pixels is small), the frame rate is set higher as a result. Such a change in the frame rate is performed without changing the operation clock.

In other words, the camera 20 is configured such that the number of pixels to be transmitted in one frame is set by the imaging range being set, and the frame rate is set by the number of pixels being set.

The image processing apparatus 10 at least includes a CPU 11, a memory 12, an image interface 13 for inputting images imaged by the camera 20, and a communication interface 14 for communicating with the integrated decision ECU 60.

The pixel values outputted from the camera 20 and the horizontal and vertical synchronizing signals are inputted to the image interface 13. The CPU 11 recognizes to which pixel location that the pixel values sequentially outputted from the camera 20 correspond based on the horizontal and vertical synchronizing signals inputted to the image interface 13. Then, the pixel values outputted from the camera 20 are stored in the memory 12 so as to correspond to the recognized pixel position. In this manner, image signals outputted from the camera 20 are stored in the memory 12.

The CPU 11 performs image processing corresponding to the uses (applications) of the various controls that the integrated decision ECU 60 performs, and outputs process results to the integrated decision ECU 60 by processing the image signals outputted from the camera 20. Specifically, for implementing the alarm process and the steering process as the applications that the integration decision ECU 60 performs, the CPU 11 performs a recognition process of a position of a recognition target object (a forward vehicle in this case) as the image processing.

Further, the CPU 11 controls an exposure control and adjustments of the imaging range and the frame rate of the camera 20 so that the recognition target object is properly recognized. Specifically, in order to adjust the exposure time, the gain, the frame rate, and the imaging range of the camera 20, the CPU 11 outputs the camera control values including those adjusting values to the camera 20. The communication interface 14 is intended to perform communication between the CPU 11 and the integrated decision ECU 60.

The integrated decision ECU 60 determines whether there is a risk that the own vehicle will contact the forward vehicle based on the position of the forward vehicle sent from the CPU 11, and when it is determined that there is such a risk, the integrated decision ECU 60 orders the alarm section 70 to raise an alarm (the alarm process). Further, when the risk is high, it not only simply raises the alarm, but orders the steering ECU 80 to perform the steering control (controls for adjusting an assist amount of a steering system, or avoiding the risk by automatically driving the steering system) (steering process).

2. Process in the CPU

Next, a process (referred to as a startup optical axis correction process) that the CPU 11 performs will be described. The CPU 11 performs the image processing (forward vehicle recognition) corresponding to the alarm process and the steering process as the applications that the integration decision ECU 60 performs after performing the optical axis correction process for correcting a deviation of an optical axis of the camera 20.

Figure 4A:
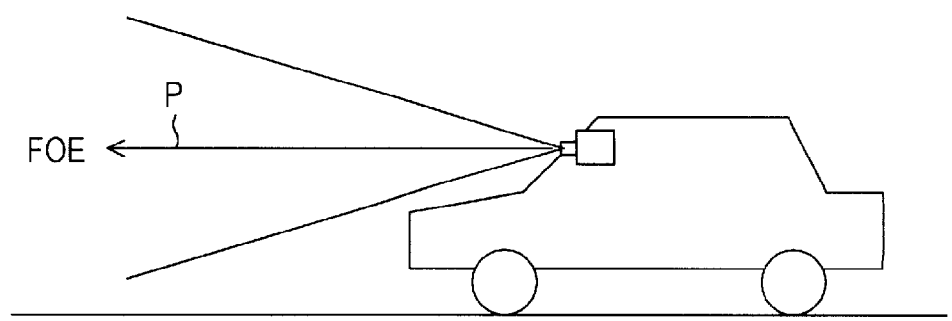
FIG. 4 shows an explanatory diagram explaining a focus of expansion (FOE) detected by an optical axis correction process, and (a) shows an explanatory diagram expressing a relationship between an optical axis of a camera and the FOE, while (b) shows an explanatory diagram explaining a deviation of the FOE due to a deviation of the optical axis.
Figure 4B:
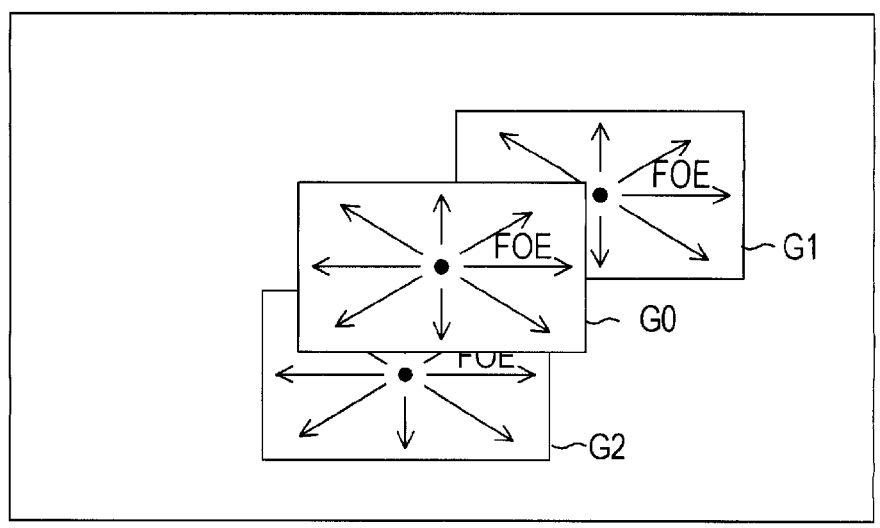

First, an overview of the optical axis correction process of the camera 20 will be described. It is assumed that when the camera 20 is disposed in the predetermined position in the vehicle cabin, the optical axis P faces a front of the vehicle in a traveling direction as shown in FIG. 4 (a), and a focus of expansion (FOE) in the imaged image (G0) is adjusted so as to be positioned in a center of the screen in the horizontal and the vertical directions (i.e., the center of the screen) as shown in FIG. 4 (b).

However, due to the fact that error may occur in the direction of the optical axis P of the camera 20 due to changes in a mounting state of the camera 20, there is a possibility that accurate positioning cannot be detected from the imaged images (for example G1, G2). A process for correcting this deviation of the direction of the optical axis P is the optical axis correction process described next. When performing the optical axis correction process, it is desirable that the imaging range is set to the full screen considering a deviation amount of the optical axis.

Next, the process that the CPU 11 performs will be described using a flowchart shown in FIG. 5. This process is performed at a timing that the CPU 11 has predetermined (for example, timing when an ignition switch is turned on), or at every predetermined period in accordance with a program stored in advance.

When the startup optical axis correction process is started, the CPU 11 first performs the optical axis correction process in S110, then after performing an exposure setting (S120), the image processing (S130) corresponding to the applications is performed, and the CPU 11 repeatedly performs the process until the timing for terminating the alarm process and the steering process as the applications (S140: YES).

Figure 6:
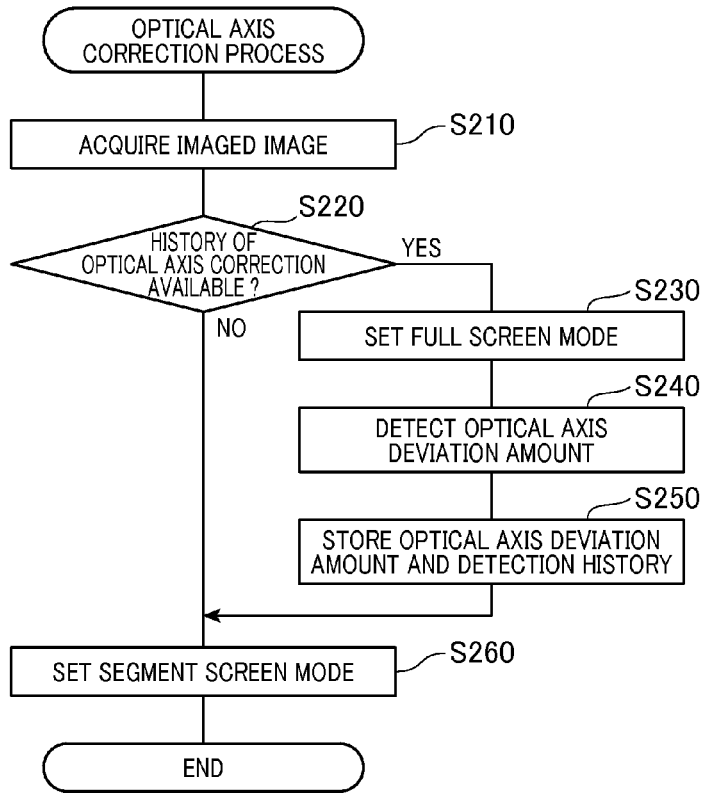
FIG. 6 shows a flowchart expressing contents of an optical axis correction process.

In the optical axis correction process performed in S110, as shown in a flowchart of FIG. 6, first, an image is acquired from the camera 20 at a predetermined exposure condition in S210. Subsequently, in S220, it is verified whether or not a history of an optical axis correction is stored in the memory 12, and the process proceeds to S260 if the history is stored, while the process proceeds to S230 if the history is not stored.

When the history of the optical axis correction is not stored, the process proceeds to S230 and the camera control values are set so that the imaging range of the camera 20 becomes full screen. Next in S240, the image (pixel value) of the full screen is acquired in the full screen mode set in S230, the focus of expansion (FOE) is calculated from the acquired image, and a deviation (hereinafter, referred to as an optical axis deviation amount) is calculated between the calculated focus of expansion and the center of the screen where the focus of expansion should have been originally positioned at. Since various methods are known for calculating the focus of expansion, a description thereof will be omitted. In subsequent S250, the calculated optical axis deviation amount and a history that the optical axis correction has been performed (e.g., a flag value or the like that indicates the history) are stored in the memory 12, then the process proceeds to S260.

Subsequently in S260, the camera control values are set so that a screen range at least required for the alarm process and the steering process as the application, i.e., the segment screen that is the range required segmented from the full screen as the imaging range, and then the present process is terminated. Note that, in S260, when proceeding from S250, the camera control values are set by performing a deviation correction process for correcting the deviation amount based on the optical axis deviation amount calculated in S240. The correction of the deviation performed by the deviation amount correction process may be implemented by adjusting the optical axis of the camera 20 by a drive mechanism, or may be implemented by adjusting the deviation amount when calculating the screen coordinates.

As a result, the optical axis correction process is implemented at a relatively low frame rate in the full screen. Meanwhile, the image processing corresponding to the alarm process and the steering process based on the forward vehicle recognition as the applications is implemented at a relatively high frame rate by setting a front of an own vehicle traveling lane as a segment screen (imaging screen).

3. Effects

As described above, in the image processing apparatus 10 of the present embodiment, the frame rate at which the camera 20 acquires the images can be changed corresponding to contents of the image processing for implementing the applications without using a high-speed operation clock. Here, when the frame rate is set high, since the process of segmenting a required image area is performed by the camera 20, it is possible to reduce a process load of the image processing apparatus 10.

In addition, in the image processing apparatus 10 of the present embodiment, since the change of the frame rate is performed without changing the frequency of the operation clock, deterioration or heat generation of the EMC properties concerned when the frequency of the operation clock is increased is suppressed from increasing.

4. Correspondence Between the Scopes of the Claims

In the present embodiment, the camera 20 corresponds to an imaging means. Further, the process of S130 corresponds to a process as an image processing means, the process of S220 corresponds to a process as a determination means, the process of S230 corresponds to a process as a first setting means, and the process of S260 corresponds to a process as a second setting means. Furthermore, the camera system 1 composed of the image processing apparatus 10 and the camera 20 in the present embodiment corresponds to an image processing system. Moreover, the full screen corresponds to a first range, the segment screen corresponds to a second range, the frame rate T1 in the full screen mode corresponds to a first frame rate, and the frame rate T2 in the segment screen mode corresponds to a second frame rate.

Second Embodiment

A second embodiment will be described. Although a configuration of an image processing apparatus of the present embodiment is similar to that of the above embodiment, process contents that the CPU 11 performs are different. In other words, although the image processing apparatus 10 (CPU 11) performs the image processing (S130) for the application such as the steering process after performing the optical axis correction process (S110), as shown in FIG. 5, in the above embodiment, the present invention can also be applied when performing image processing corresponding to various applications without performing the process of correcting the optical axis at the beginning.

Figure 7:
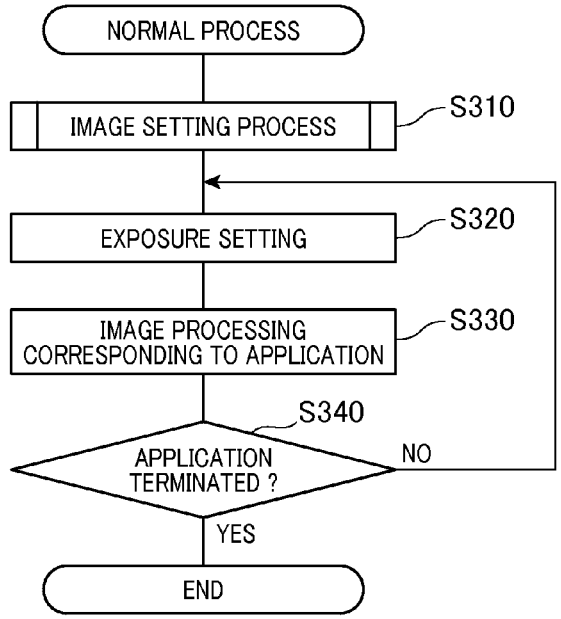
FIG. 7 shows a flowchart expressing contents of a normal process in a second embodiment.

A normal process that the CPU 11 of the present embodiment performs will be described with reference to a flowchart of FIG. 7. In the present process, first, an image setting process is performed at S310. Subsequently in S320 to S340, the same process as S120 to S140 shown in FIG. 5 is repeated until the applications are terminated (S340: YES).

Figure 8:
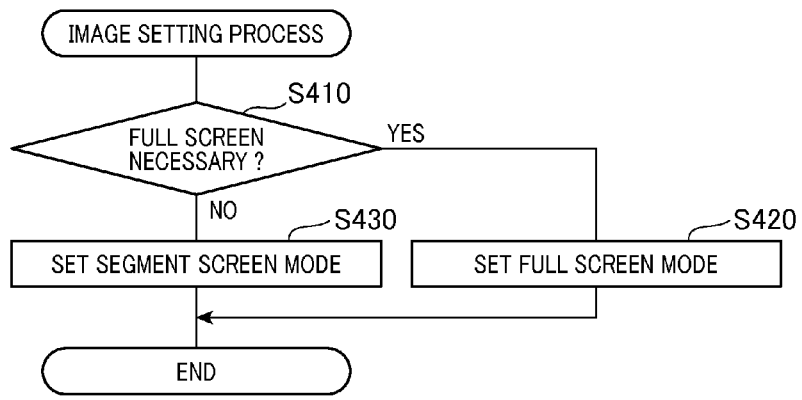
FIG. 8 shows a flowchart expressing contents of an image setting process.

In the image setting process performed in S310, as shown in a flowchart of FIG. 8, first, for the image processing performed in S330, that is, for the image processing corresponding to the application to be implemented in an integrated process, it is determined whether it should be performed using the full camera resolution and for an image imaged at a relatively low frame rate in S410.

Here, when it is determined that the image processing is performed in the full screen and for the image imaged at the relatively low frame rate in S410 (S410: YES), the process proceeds to S420, and the present process is terminated after setting control values of the full screen mode as the camera control values. On the other hand, when the determination is negative in S410 (S410: NO), the process proceeds to S430, and the process is terminated after setting control values of the segment screen mode as the camera control values.

Specifically, when performing the image processing corresponding to the optical axis correction process as an application, for example, if the determination is affirmative in S410, the camera control values are set in the control values of the full screen mode. Further, when performing the alarm process and the steering control process based on the forward vehicle recognition as applications, if determination is negative in S410, the camera control values are set to the control values of the segment screen mode that sets the front of the own vehicle traveling lane as the imaging range.

As described above, in the present embodiment, according to the determination in S410, it is possible to perform the image processing using the imaged image captured at an image area and a frame rate corresponding to various applications, and the effect as in the above embodiment can be obtained.

Third Embodiment

A third embodiment will be described. In the present embodiment, although a configuration of the device is similar to that of the above embodiment, parameters of the camera control values are partially different from the above embodiment. In other words, a clock frequency parameter for setting the frequency of the pixel clock of the camera 20 is added to the camera control values parameter set in the above embodiment in the parameters of the camera control values of the present embodiment. Then, the camera 20 is configured such that the frequency of the pixel clock of the camera 20 is changeable by the control value of the clock frequency parameter.

Figure 9:
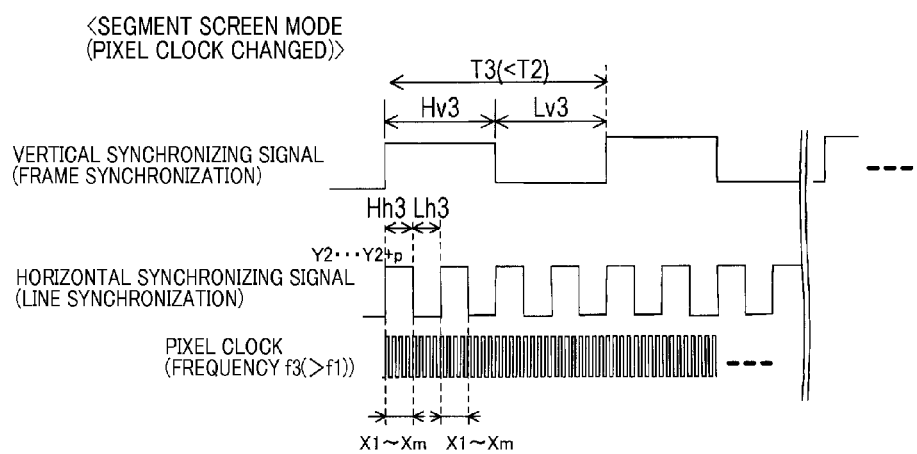
FIG. 9 shows an explanatory diagram explaining timing signals when a clock frequency is set to a frequency higher than in the segment screen mode in the first embodiment in a third embodiment.

That is, although a change in the frame rate is implemented without changing the clock frequency (f1) of the pixel clock in the above embodiments, it is possible to implement a higher frame rate as shown in FIG. 9, when necessary, by changing the clock frequency (f2) to (f2>f1) in the present embodiment.

Other Embodiments (1) Although the image processing apparatus 10 for implementing the alarm process or the steering control as the applications (hereinafter, referred to as the segment screen applications) that use the image processing (recognition process of the forward vehicle) in the imaged image acquired using the segment screen mode has been described in the above embodiment, uses (applications) of the image processing apparatus are not limited thereto.

Specifically, the segment screen applications may be a variety of applications that implement the sensing of the front of the own vehicle in addition to the alarm process and the steering control process based on the forward vehicle recognition, such as an alarm process and a steering control process based on a white line recognition process that sets at least a range in front of the own vehicle where a white line is present to a segmenting range, or an alarm process and avoiding process based on a pedestrian recognition process that sets at least a detected area of a pedestrian in front of the own vehicle to a segmenting range.

Alternately, as the segment screen applications, there may be applications that implement functions of a raindrop sensor for detecting raindrops on a front wind shield, a fog sensor for detecting a fogging of the front wind shield, another fog sensor for detecting an occurrence of fog in front of the own vehicle, an illuminance sensor for detecting brightness of the sky, a distance sensor for detecting a distance to a target object using a stereo camera, or a road surface detection sensor for detecting edges of a road.

Figure 10:
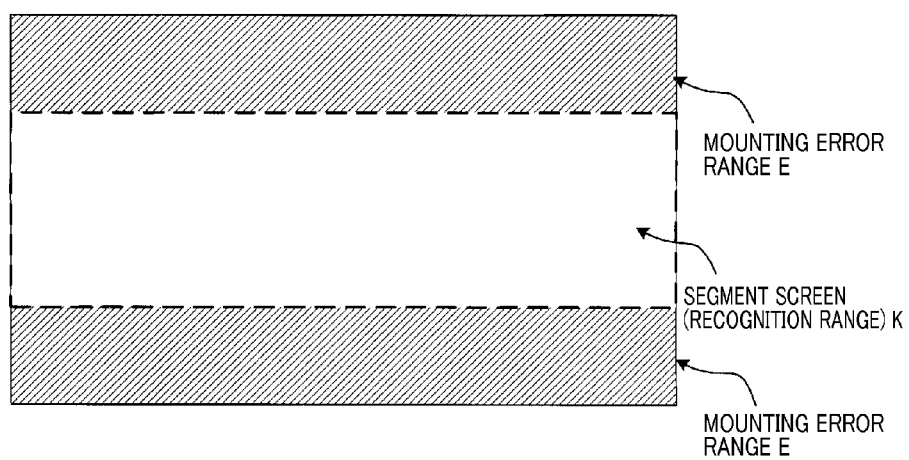
FIG. 10 is an explanatory diagram explaining a segment screen in another embodiment.

In other words, the segment screen mode is applied to an application that requires a recognition range assumed beforehand as the segment screen and frequent updates of the segment screen. It should be noted that this segment screen (recognition range) K may be set in a range ignoring mounting error ranges E that are set as a mounting error of the camera 20 within the full screen, as shown in FIG. 10.

Meanwhile, in addition to the optical axis correction process, applications such as a process of generating a bird's-eye view, a process of generating an image to which predetermined information is added on a screen of a car navigation system, a drive recorder that records details of driving of the own vehicle or an environment during driving, or a process for a night-vision system for ensuring night vision may be mentioned as an application that performs the image processing using an imaged image acquired in the full screen mode (hereinafter, referred to as the full screen applications).

In other words, in addition to the optical axis correction process, the full screen mode is applied to applications where there is less influence on a precise performance of the application when the optical axis is deviated, and less frequent performance is required. Incidentally, the full screen mode may be applied to the segment screen applications mentioned above, if necessary.

(2) Although the camera is intended to image the front of the vehicle in the above embodiment, the present invention is not limited thereto, and it is possible to apply the present invention to various applications that can be performed by using images imaged by a camera that images surroundings such as behind the vehicle or sides of the vehicle.

(3) In the above embodiment, the imaged images are acquired by the camera 20 by switching to either one of the full screen mode and the segment mode corresponding to the application. In contrast, it may be configured to set a plurality of segment screen modes where image ranges for segmenting and frame rates are different corresponding to the application, and switch between these modes. Alternatively, it may be configured to set a plurality of segment screen modes where image ranges for segmenting and frame rates are different without setting the full screen mode, and switch between these modes.

(4) Although the sensor section 30 is composed by the CMOS image sensor in the above embodiment, the sensor section 30 may be composed by a CCD image sensor.

(5) In the above embodiment, the data transmission between the camera 20 and the image processing apparatus 10 by the communication interface 14 may be a parallel transmission system or may be a serial transmission system.

(6) In the above embodiment, if the frequency of the operation clock used in the camera 20 is higher than the frequency of the operating clock used in the CPU 11, etc. of the image processing apparatus 10, a frequency divider may be provided on a data transmission path from the camera 20 to the to the image processing apparatus 10.

(7) The image processing apparatus 20 may be configured to perform the process that the integrating decision ECU 60 performs in the above embodiment.

(8) Components of the image processing apparatus 10 exemplified in the above embodiment may be implemented by hardware, may be implemented by software, or may be implemented by a combination of hardware and software. For example, at least a part of the image processing apparatus 10 may be formed by a computer system (for example, a microcomputer) that performs the above-described process (a program). Moreover, these components are functionally conceptual, and a part or all may be functionally or physically dispersed or integrated.

(9) The above embodiment is only an example that the present invention is applied.

The present invention may be implemented in various forms such as an image processing apparatus, an image processing method, a program for a computer to function as an image processing apparatus, or a recording medium recording the program.

REFERENCE SIGNS LIST

1 . . . camera system
10 . . . image processing apparatus
11 . . . CPU
20 . . . camera
30 . . . sensor section
40 . . . oscillator
50 . . . control section

The invention claimed is:

1. An image processing apparatus that processes an image captured by an imaging means in a predetermined imaging range for every predetermined frame rate comprising:
 an image processing means, using a processor, that performs an image processing application on image data of the image captured by the imaging means, the image processing application comprising at least one of a plurality of image processing applications;
 a first setting means, using the processor, that sets the imaging means to image a predetermined first range in the imaging range with a predetermined first frame rate;
 a second setting means, using the processor, that sets the imaging means to image a second range, which is a part of the imaging range imaged by the imaging means and is narrower than the first range, with a second frame rate higher than the first frame rate; and
 a determination means, using the processor, that selects one of the first setting means and the second setting means depending on the image processing application that the image processing means performs, wherein
 the first setting means is selected for image processing applications amongst the plurality of image processing applications that are less frequently performed, and the plurality of image processing applications comprise at least one of a white line recognition process, a pedestrian recognition process, an optical axis correction process, a process for generating a bird's-eye view, a process for generating an image to which predetermined information is added on a screen of a car navigation system or drive recorder system, and a process for a night-vision system.

* * * * *